INVENTOR
ROBERT L. CARROLL
BY Donald R Castle
AGENT

United States Patent Office 3,437,440
Patented Apr. 8, 1969

3,437,440
PREPARATION OF OXO-ACIDS OF PHOSPHORUS
Robert L. Carroll, St. Louis, Mo., assignor to Monsanto Company, St. Louis, Mo., a corporation of Delaware
Filed Feb. 8, 1967, Ser. No. 614,670
Int. Cl. C01b 25/02
U.S. Cl. 23—165    6 Claims

ABSTRACT OF THE DISCLOSURE

Phosphorous acids can be prepared by reacting elemental phosphorus and molecular iodine in substantially stoichiometric amounts to form phosphorus triiodide in a heel of molten phosphorus triiodide, withdrawing a portion of phosphorus triiodide from the heel of phosphorus triiodide, followed by hydrolyzing a portion of the phosphorus triiodide to phosphorous acid and hydrogen halide, thereafter separating the phosphorus acid and hydrogen iodide and oxidizing hydrogen iodide to molecular iodine for reuse as a reactant.

---

Figure 1:
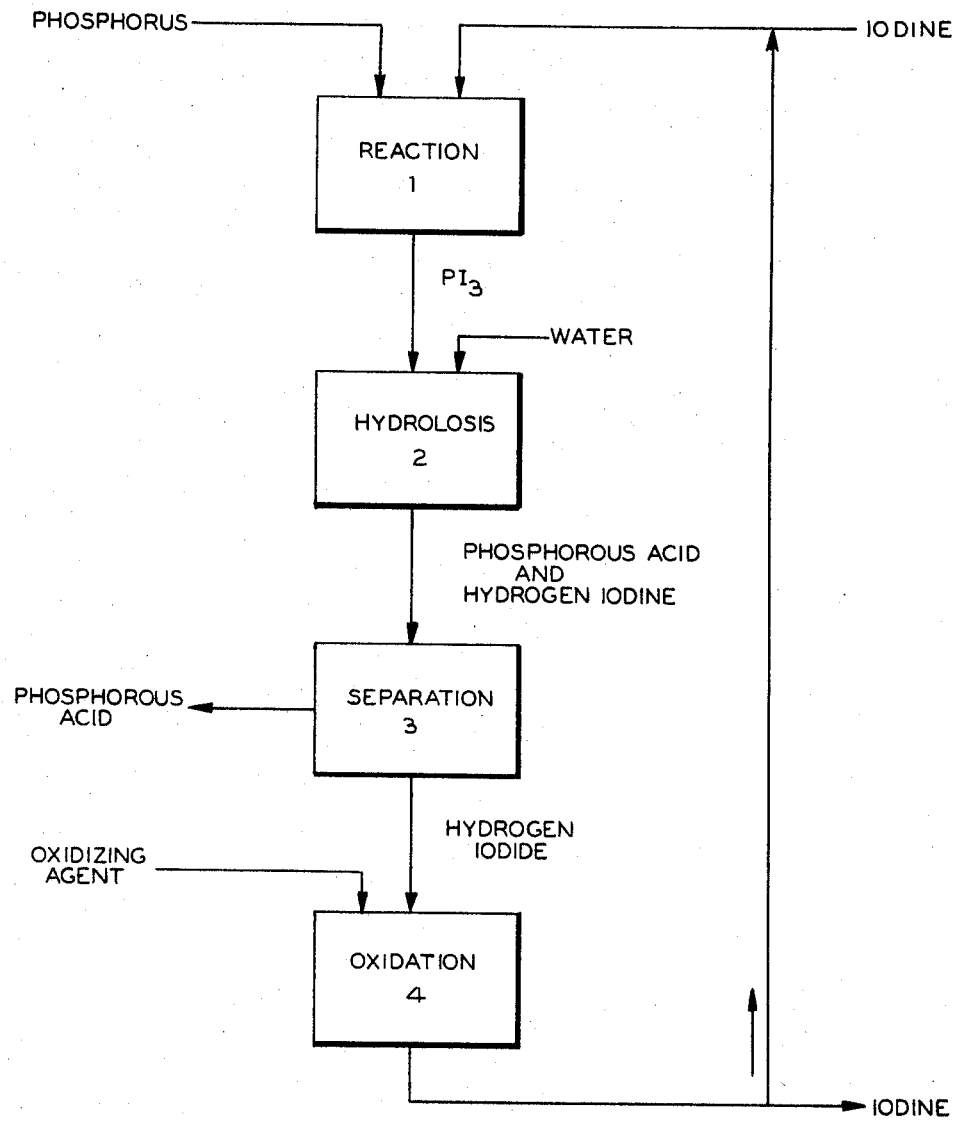

This invention relates to the production of oxo-acids of phosphorus in which the phosphorus is in the +3 oxidation state. More particularly, it relates to a process for producing oxo-acids of phosphorus utilizing elemental phosphorus and molecular iodine.

The oxo-acids of phosphorus which can be prepared by the process of this invention are pyrophosphorous acid, anhydrous orthophosphorous acid, and mixtures thereof (otherwise known as condensed phosphorous acids) and aqueous solutions of orthophosphorous acid. Pyrophosphorous acid has the formula, $H_4P_2O_5$, and can be characterized as having a $P_2O_3$ content of about 75% by weight. Anhydrous orthophosphorous acid has the formula, $H_3PO_3$, and can be characterized as having a $P_2O_3$ content of about 67% by weight. When the $P_2O_3$ content of the phosphorous acid is greater than 67% but less than 75%, it is believed to be mixtures of orthophosphorous acid and pyrophosphorous acid. The "condensed" phosphorous acids, therefore, as used herein, are the phosphorous acids having a $P_2O_3$ content of from about 67% to about 75% by weight. Additionally, aqueous solutions of orthophosphorous acid having an $H_3PO_3$ content as desired can be prepared by the process of this invention.

Oxo-acids of phosphorous in which the phosphorus is in the +3 oxidation state have heretofore been prepared by forming an intermediate phosphorus compound in which the phosphorus is in the +3 oxidation state, and thereafter reacting the intermediate with another compound to yield the appropriate acid. For example, it has been reported that pyrophosphorous acid can be prepared by reacting barium pyrophosphite with a stoichiometric amount of sulfuric acid at 0° C. Also, crystalline pyrophosphorous acid has been claimed to have been made by the violent agitation of a mixture of orthophosphorous acid and phosphorus trichloride using a current of carbon dioxide at about 35° C. Neither of the foregoing methods are believed to be suitable as commercial processes. Orthophosphorous acid and aqueous solutions thereof have heretofore been prepared by the hydrolysis of $PCl_3$ with water. This process requires the reaction of elemental phosphorus with chlorine to first form $PCl_3$, which is thereafter hydrolyzed to orthophosphorous acid. An excess of phosphorus is generally required to avoid the formation of phosphorus pentachloride which does not hydrolyze to orthophosphorous acid. The hydrolysis reaction to form orthophosphorous acid is not free from difficulty and, unless close control of the reaction is utilized, side reactions can occur which adversely affect the yield and purity of the orthophosphorous acid. None of the processes heretofore known are believed to have the advantages of having the flexibility of being able to produce various phosphorous acids and producing the phosphorous acids by consuming only elemental phosphorus and water as raw materials. It is believed that such a process for the production of oxo-acids of phosphorus in their +3 oxidation state would be an advancement in the art.

In accordance with the invention, it has been discovered that the phosphorous acids can be prepared continuously by (a) reacting elemental phosphorus and molecular iodine in substantially stoichiometrically equivalent amounts in a molten medium of phosphorus triiodide to thereby form additional phosphorus triiodide, (b) withdrawing a portion of phosphorus triiodide, (c) hydrolyzng said portion of phosphorus triiodide to phosphorous acids and hydrogen iodide by the controlled addition of water (d) separating the phosphorous acids and hydrogen iodide, (e) oxidizing hydrogen iodide to molecular iodine for reuse as a reactant.

To facilitate the explanation of the process of this invention FIGURE 1 representing a flow sheet of the process is presented. The major steps of reaction, hydrolysis, separation and oxidation are each discussed under their separate headings in the detailed description following.

Reaction step

Referring to FIGURE 1, the two reactants, that is, elemental phosphorus and iodine are reacted in a heel of molten phosphorus triiodide in the reaction step. Since $PI_3$ has a melting point of about 61° C., the temperature of the reaction medium must be held above about 61° C. to keep the medium in a molten state. Under these temperature conditions, the phosphorus and iodine react to form additional $PI_3$. There is a tendency for phosphoric acids and polymeric materials to be formed instead of the desired phosphorous acid when the hydrolysis of phosphorus triiodide is carried out at temperatures in excess of about 100° C. Therefore, although the temperature of the reaction medium can be as high as about 150° C. and $PI_3$ will be formed, it is preferred to use a lower reaction temperature, that is below about 100° C., particularly when the $PI_3$ is to be hydrolyzed directly from the reaction medium. Since the reaction of phosphorus and iodine to form phosphorus triiodide proceeds sufficiently rapid at temperatures below 85° C., it is generally preferred to conduct the reaction below about 85° C. to thereby enable hydrolysis directly without cooling. It is preferred, therefore, to use reaction temperatures of from about 65° C. to about 85° C. in the practice of this invention.

Essentially stoichiometrically equivalent amounts of elemental phosphorus and molecular iodine should be used to achieve the maximum benefits from the practice of this invention. The molecular iodine and elemental phosphorus should be added in stoichiometric ratios as shown in the following equation, $$2P + 3I_2 \rightarrow 2PI_3$$

thus, the atomic ratio of phosphorus to iodine should be about 1:3. In the practice of this invention, a large excess of phosphorus should be avoided because it can react with $PI_3$ to form $P_2I_4$ which upon hydrolysis yields a mixture of orthophosphorous acid, orthophosphoric acid and other oxo-acids. Generally, the retention time in the reaction step will be relatively short since the reaction of phosphorus and iodine to form $PI_3$ is rapid. The reaction of phosphorus and $PI_3$ is relatively slow, therefore, some excess phosphorus can be tolerated since the $PI_3$ will generally be hydrolyzed before it reacts with the excess phosphorus. Use of a large excess, that is, an excess greater than about 20%, of iodine should be avoided because if such an excess of iodine is used, the iodine will tend to oxidize the phosphorous acids formed during hydrolysis to phosphoric acids. It is possible to first separate the excess iodine from the $PI_3$ prior to hydrolysis but this adds an additional separation step to the process. In most instances, therefore, it is preferred to use less than about 10% excess of phosphorus or molecular iodine, however, excess amounts up to about 20% of either phosphorus or iodine are usually suitable.

Since phosphorus and iodine react quite rapidly to form phosphorus triiodide, relatively short retention times in the reaction vessel can be used. One method which is generally adequate to provide sufficient retention time is achieved by the use of a baffled reactor with an overflow on one side of the baffle and a provision for the phosphorus and iodide streams to enter on the other side of the baffle. The baffle thereby insures that the reactants will not "short-circuit" and thereby affords sufficient retention time (under the preferred operating conditions generally about 1 to 2 minutes) to enable complete reaction of the phosphorus and iodine. Since phosphorus triiodide is stable at the operating temperatures, longer retention times can be used.

Any amount of heel which is sufficient to dissolve the phosphorus and iodine can be used. Since both iodine and phosphorus are highly soluble in $PI_3$, the amount of heel used in most instances will be determined by other design factors such as retention time, heat transfer and the like, rather than by the solubility of phosphorus and iodine in $PI_3$.

Hydrolysis step

After the phosphorus and iodine have reacted, a portion of the $PI_3$ is withdrawn and hydrolyzed with water under controlled conditions to form the phosphorous acids as shown in FIGURE 1. In most instances, an overflow from the reaction vessel at a level which leaves a sufficient size heel will be used. In general, any method of reacting $PI_3$ with water can be used, such as the $PI_3$ can overflow from the reaction vessel into a stirred vessel containing water or water can be added to the portion of the $PI_3$ which is withdrawn from the heel.

Phosphorus triiodide can be hydrolyzed under controlled conditions to form orthophosphorous acid, pyrophosphorous acid or mixtures thereof. The hydrolysis reactions that occur can be represented by the following equations:

(1)     $2PI_3 + 6H_2O \rightarrow 2H_3PO_3 + 6HI$ (2)     $2PI_3 + 5H_2O \rightarrow H_4P_2O_5 + 6HI$ (3)     $PI_3 + 5H_3PO_3 \rightarrow 3H_4P_2O_5 + 3HI$ From the above reactions, it is shown that it is possible to obtain the desired phosphorous acid by adjusting the amount of water that is used to hydrolyze the $PI_3$. For example, if pyrophosphorous acid is desired, the water used to hydrolyze the $PI_3$ is in a weight ratio to phosphorus of about 1.46:1. Therefore, the rate of water addition at the hydrolysis step will be based upon the rate of phosphorus addition at the reaction step. If a mixture of pyrophosphorous acid and orthophosphorous acid is desired, then weight ratios of water to phosphorus greater than 1.46:1, but less than 1.75:1 are used. If essentially anhydrous orthophosphorous acid is desired, then a water to phosphorus ratio of 1.75:1 should be maintained. However, in most instances, if orthophosphorous acid is the desired product, control of the amount of water is not as critical since most of it can be removed from the orthophosphorous acid to achieve a highly concentrated form of orthophosphorous acid. In most instances, however, it will not be desirable to produce extremely dilute solutions of orthophosphorous acid, therefore, the ratio of water to phosphorus seldom exceeds about 20:1 and preferably in most instances a weight ratio of water to phosphorus, when solutions of orthophosphorous acid are desired, of from about 2:1 to about 15:1 will be utilized.

As previously mentioned, it is also preferred that the temperature of the hydrolysis reaction be controlled at temperatures from about 65° C. to about 85° C. When pyrophosphorous acid is produced, it is especially preferred not to exceed a temperature of about 80° C. Lower temperatures such as about 50° C. or even lower such as about 10° C. to about 20° C. can be used if desired. The hydrolysis temperature when orthophosphorous acid is desired, and particularly when solutions of orthophosphorous acid are desired, is as critical as when the condensed phosphorous acids are produced and can be conducted at temperatures up to about 90° C. However, it is preferred, in most instances, not to exceed a temperature of about 80° C. during the hydrolysis regardless of the phosphorous acid that is being formed.

It is also to be noted that, in addition to controlling the temperature during the hydrolysis reaction, a relatively thorough mixing of water and phosphorus triiodide is preferred to prevent local overheating and to insure a uniform distribution of water and $PI_3$. Conventional means of agitation are satisfactory, however, a relatively uniform dispersion of the water and phosphorus triiodide is preferred so that polymeric materials (which are generally yellow in color) are not readily formed during the hydrolysis step due to local overheating. This is particularly necessary when pyrophosphorous acid is produced.

Separation step

As shown in FIGURE 1, the hydrogen iodide and phosphorous acids are separated. When the condensed phosphorous acids are produced, most of the hydrogen iodide will be evolved as a vapor at the time the phosphorus triiodide is hydrolyzed. The hydrogen iodide vapor can be oxidized while in the vapor phase to molecular iodide as hereinafter described or it can be dissolved in water and then oxidized to molecular iodide. The remaining minor amounts of hydrogen iodide which are dissolved in the condensed phosphorous acids can be removed from the condensed phosphorous acids by placing the mixture of acid and minor amounts of hydrogen iodide under reduced pressure, such as of about 500 mm. of mercury or less, and then heating to about 100° C. It is to be noted that pyrophosphorous acid decomposes at about 130° C., therefore, temperatures as high as 130° C. are to be avoided. Since the foregoing separation is relatively simple and enables subsequent recovery of the iodine values easily, it is the preferred separation method. Other conventional means of separation of the residual amount of hydrogen iodide that is not evolved during hydrolysis such as extraction, crystallization and the like can be used; since these methods generally are more difficult and add to the cost of the process, they are not preferred.

If solutions of orthophosphorous acids are produced, distillation offers a relatively simple means of separating the phosphorous acid and hydrogen iodide. A constant boiling azeotrope of water and hydrogen iodide is removed at 127° C. under atmospheric pressure. Vacuum distillation can be used, if desired, with lower temperatures for removal for the azeotrope. In some instances, some residual hydrogen iodide, generally less than about 10% by weight of the total hydrogen iodide, remains in the aqueous solution of orthophosphorous acid. This residual amount of hydrogen iodide is easily removed by stripping with steam having a pressure of greater than about 5 pounds per square inch gauge. Since orthophosphorous acid decomposes at about 200° C., the solution should not be heated to that temperature; therefore, high pressure steam should not be used to strip out the residual hydrogen iodide not removed by distillation. In most instances, steam stripping at temperatures below about 125° C. are adequate to remove any residual hydrogen iodide therefore are preferred. Although distillation is the preferred method of separating hydrogen iodide and orthophosphorous acid, other conventional methods can be used such as extraction, by a selective solvent, crystallization, and the like; however, as previously mentioned, these methods add to the cost of the process.

Oxidation step

After the hydrogen iodide is separated from the phosphorous acids, the hydrogen iodide can be oxidized to molecular iodine as shown in FIGURE 1 by a number of methods known in the art. Chemical oxidation by an oxidizing agent which will oxidize hydrogen iodide to molecular iodine, is one of the preferred methods. Generally the oxidizing agents which can be used are those which will oxidize hydrogen iodide to molecular iodine in an acidic aqueous medium. They can be characterized by reference to their standard oxidation potentials in acidic mediums; that is, the potential (E° usually expressed in volts) of its oxidation-reduction couple relative to the potential of a hydrogen gas-hydrogen ion couple used as a standard with the comparison conducted at 25° C., with their couples in their standard state. Thus, the oxidizing agents which are suitable in the practice of this invention are those having an E° value less (algebraically more negative) than the standard oxidation potential for the iodide-iodine couple. The E° value for the iodide-iodine couple in an acidic aqueous medium is reported as −0.5355 volts. Examples of suitable oxidizing agents include nitric acid, the metallic nitrate salts, the bromates, bromine, the oxides of nitrogen, such as nitric oxide, nitrogen dioxide, metallic chromates, metallic manganates and the like. Other suitable materials include those listetd as having a standard oxidation potential of less than about −0.54 volt in acidic aqueous solutions in Latimer, "Oxidation Potentials," 2nd. ed., Prentiss Hall (1952), pp. 342–345. In most instances, oxidizing agents having oxidation potentials are more negative than about −1.0 and will yield relatively rapid oxidation of the hydrogen iodide. In some instances, oxidizing agents can be used which in their reduced forms have an oxidation potential sufficiently negative to oxidize hydrogen iodide. Nitric acid, for example, will reduce to nitrous acid which is capable of oxidizing addtional hydrogen iodide. The amount of chemical oxidizing agent, therefore, that is used will be dependent upon the particular oxidizing agent that is selected. Additionally, certain oxidizing agents can have reduced forms which can be regenerated relatively easily. That is, they can be oxidized to their original state with air under proper conditions. Nitric acid is an example of such an oxidizing agent because its reduced form (nitrogen dioxide) can be regenerated to nitric acid by oxidation with air to nitric oxide and absorbing the nitric oxide in water. Nitric acid is, therefore, the preferred oxidizing agent when hydrogen iodide is regenerated from its aqueous solution.

Hydrogen iodide in the vapor state can also be converted to molecular iodine by direct oxidation using either air or molecular oxygen over an acid active catalyst such as vanadium oxide, copper chloride, silica-alumina, and the like. This method, when using air, offers an inexpensive method for regeneration and is particularly preferred when condensed phosphorous acids are produced. Furthermore, it can be conducted while the hydrogen iodide is in the vapor state by passing air and the vaporized hydrogen iodide through a catalyst bed, thus eliminating the condensation of the hydrogen iodide and water, which is generally necessary in other methods of recovery. Another useful method of vapor or liquid state oxidation of hydrogen iodide is to use an air stream containing a small amount of nitrogen dioxide (about 5% nitrogen dioxide or nitric oxide) which seems to catalyze the oxidation reaction. The amount of the foregoing oxides of nitrogen in the air stream can be less than 5% by volume and still achieve the catalytic effect upon oxidation at a pressure of about 4 pounds per square inch gauge and at about 25° C. Higher temperatures such as up to about 130° C. and be used if faster regeneration rates are desired.

An additional method for regenerating molecular iodine from hydrogen iodide is by use of an electrolytic cell. In this method an electromotive force (EMF) is applied to the electrodes, preferably a platinum cathode and a graphite anode, which are immersed in an aqueous solution of hydrogen iodide. It is necessary to keep the EMF below about 2 volts to avoid oxygen being liberated from the solution at the anode. Therefore, the preferred EMF is from about 0.6 volt to about 1.2 volts to enable the generation of molecular iodine without the liberation of oxygen. A current density of from about 0.1 to about 0.3 ampere per square centimeter at the electrodes is generally preferred.

Since iodine has a relatively low solubility in water, separation from the aqueous solutions is relatively simple. In most instances, iodine will form a separate phase from the aqueous solution and can be withdrawn, dried by heating to about 110° C., and recycled to the heel of phosphorus triiodide. In most instances, near theoretical recovery is achieved, that is, up to about 99.5% of theory, therefore, a constant phosphorus feed rate can be established and the recycle iodine stream will be in substantially stoichiometric proportion to the feed rate of phosphorous and only small amounts of new iodide need to be added.

Nonlimiting specific embodiments of the present invention are given in the following detailed examples. All parts, proportions and percentages are by weight unless otherwise indicated.

EXAMPLE I

Figure 2:
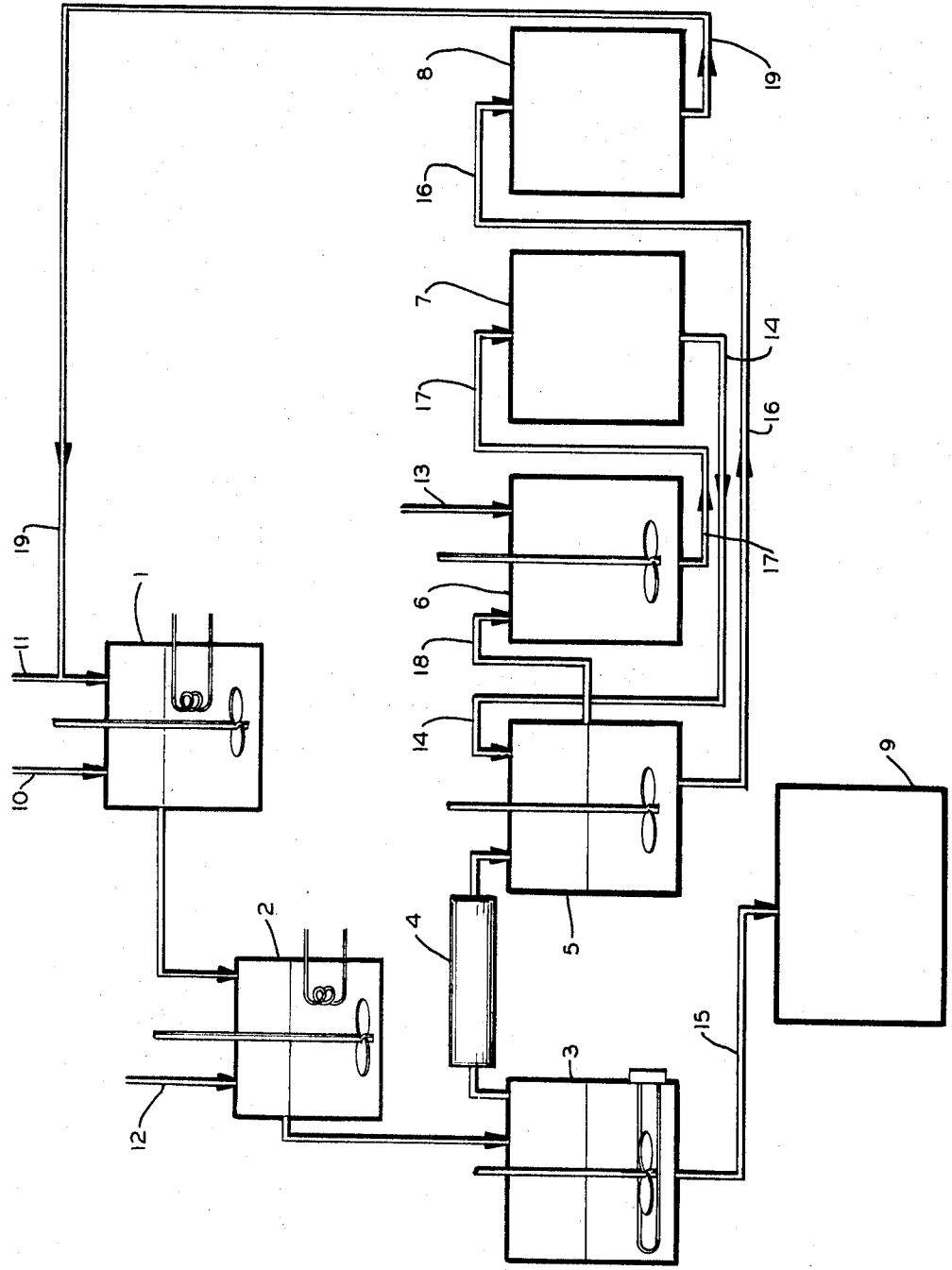

To aid in the explanation of the specific embodiment of this example FIGURE 2 is presented. A reaction vessel 1 equipped with a stirrer, a heating and cooling coil and an overflow is initially charged with about 1,000 parts of phosphorus triiodide and heated to about 70° C. Molecular iodine is fed through line 11 concurrently with elemental phorphorus fed through line 10 to the molten phosphorus triiodide while it is being stirred. The rate of addition of phosphorous is about 10 parts per hour. Iodine is added at a rate to maintain about a 12.3:1 weight ratio. The temperature of the contents of the reaction vessel 1 are held to at about 70° C. An overflow stream of $PI_3$ to reaction vessel 2 is established. The overflow stream is quenched in reaction vessel 2 which is equipped with a stirrer and a cooling coil to which water is added through line 12 at a weight ratio of about 12:1 based upon the amount of phosphorus being added to the reaction vessel 1. After the mixture is stirred, a stream of hydrolyzed material containing water, $H_3PO_3$ and HI is withdrawn continuously to a distillation unit 3. The material is then heated to about 127° C. by steam in the heating coils. A water and hydrogen iodide azeotrope is vaporized and condensed in condenser 4. When the temperature of the vessel contents reaches about 135° C., the steam is turned off of the coils and the orthophosphorus acid is transferred to storage 9 by line 15. The condensate, from condenser 4, is charged to a vessel 5 equipped with a stirrer and a coiling coil. An aqueous nitric acid solution containing about 30% nitric acid is added through line 14 to the vessel 5 at a rate which will yield a nitrate ion to iodine ratio of about 4:1. The contents are stirred and the temperature is maintained at about 60° C. for about ½ hour. The iodine is separated from the aqueous solution by decanting off the water solution of nitric oxide 18. The nitric oxide is oxidized to nitric acid in a reaction vessel 6 by air added through line 13. The nitric acid is transferred through line 17 to nitric acid storage 7. After drying by heating to about 110° C., the iodine is transferred through line 16 to iodine storage 8 from which it can be added through line 19 to the heel of $PI_3$ in reaction vessel 1.

Substantially similar results can be achieved in the process of this example by substituting substantially equal molecular equivalent amounts of other nitrogen containing materials for the nitric acid of this example. For example, nitrogen dioxide, nitrous acids, and the alkali metal nitrate salts can be substituted in substantially equal molecular amounts for the nitric acid in the above process with good results.

EXAMPLE II

A reaction vessel similar to vessel 1 in FIGURE 2 equipped with a stirrer, a heating and cooling coil and an overflow pipe is charged with about 1,000 parts of phosphorus triiodide and heated to about 75° C. Molecular iodine and elemental phosphorus are added simultaneously to a heel of molten phosphorus triiodide while it is being stirred. Phosphorus is added at a rate of about 10 parts per minute and an atomic ratio of iodine to phosphorus of about 3:1 is used. The temperature of the reaction vessel contents is held at about 75° C. and an overflow stream is established. Analysis of a sample of the overflow stream indicates essentially all of the phosphorus is contained as phosphorus triiodide. The overflow stream is added to a second vessel similar to that shown as vessel 2 in FIGURE 2 to which water is added at the rate of about 14.5 parts per minute, while the contents of the vessel containing the water are being stirred. The temperature of the contents of the vessel is held at about 40° C. and hydrogen iodide is vaporized from the vessel and is absorbed in water. The material in the reaction vessel is heated to about 100° C. under an absolute pressure of about 500 mm. of Hg. A sample of the contents after the material has been heated for about 1 hour indicates that of the phosphorus contained as oxo-acids, essentially 100% is pyrophosphorus acid. The hydrogen iodide evolved during hydrolysis is recovered by absorbing the vapor in an aqueous stream of water and added to that recovered during hydrolysis. When the aqueous solution contains about 57% hydrogen iodide, it is transferred to a pressure vessel equipped with a stirrer and a heating coil. A pressure of about 4 pounds per square inch gauge is established by injecting molecular oxygen into the reactor. About 1 part of nitrogen dioxide per 33 parts of hydrogen iodide is introduced. Over a period of about 3 hours, a temperature of about 30° C. and a pressure of about 4 p.s.i. are maintained. All of the hydrogen iodide is converted to iodine. The iodine is dried by heating to about 110° C. and is then transferred to storage for recycle to vessel where it is reacted with phosphorus.

EXAMPLE III

A reaction vessel equipped with a stirrer, a heating and cooling coil and an overflow pipe similar to vessel 1 in FIGURE 2 is charged with about 1,000 parts of phosphorus triiodide and heated to about 75° C. Molecular iodine and elemental phosphorus are added to the heel of molten phosphorus triiodide while the heel is being stirred. Phosphorus is added at a rate of about 10 parts per minute and an atomic ratio of iodine to phosphorus of about 3:1 is used. The temperature of the reaction vessel contents is held at about 75° C. and an overflow stream is established. Analysis of a sample of the overflow stream indicates essentially all of the phosphorus is contained as phorphorus triiodide. The overflow stream is added to a second vessel similar to vessel 2 in FIGURE 2 to which water is added at the rate of about 130 parts per minute while the contents of the vessel containing the water are being stirred. Analysis of a sample of the material shows that essentially all of the phosphorus is contained as $H_3PO_3$.

The material overflows into a distillation unit similar to vessel 3 in FIGURE 2 where it is heated to about 127° C. and the hydrogen iodide is removed as a vapor. While the hydrogen iodide is in the vapor state, it is mixed with a stream of air containing about 5% nitric oxide heated to about 100° C. The air stream is added to the hydrogen iodide vapor in a large tank to give about a 200% excess of oxygen based upon the oxygen required to oxide HI to $I_2$. Molecular iodine is formed which condenses in the vessel to which the air is added. The condensed iodine is recycled to storage for reuse as a reactant.

The remaining material in the distillation unit is steam stripped at a temperature of about 127° C. for about ½ hour. The material condensed from the steam stripping of the orthophosphorous acid is charged to a vessel equipped with a platinum cathode and a graphite anode. A voltage of about 1.2 volts and a current density of about 0.2 ampere/sq. cm. are maintained at the electrode. Molecular iodine is formed, which is insoluble in the water, and is withdrawn, dried by heating to about 110° C. and recycled for use as a reactant.

The remaining aqueous solution is a relatively concentrated orthophosphorous acid solution which is suitable for transferring to storage for use in subsequent reactions such as in the preparation of various organo-phosphorous compounds.

What is claimed is:

1. A process for producing phosphorous acid comprising (a) reacting elemental phosphorus and molecular iodine in substantially stoichiometric amounts in a molten medium of phosphorus triiodide to thereby form additional phosphorus triiodide, (b) withdrawing a portion of phosphorus triiodide, (c) hydrolyzing said portion of phosphorus triiodide by the controlled addition of water at a weight ratio to phosphorus of at least about 1.46:1, respectively, to thereby form phosphorous acid and hydrogen iodide, (d) separating said phosphorous acid and said hydrogen iodide and (e) oxidizing hydrogen iodide to molecular iodine for reuse as a reactant.

2. A process according to claim 1 wherein the temperature of said medium is from about 61° C. to about 100° C.

3. A process according to claim 1 wherein said water is added at a weight ratio to said phosphorus of from about 1.46:1 to about 1.75:1 and wherein the temperature during said separating phosphorous acid from said hydrogen iodide is below about 130° C. and wherein said iodine from step (e) is recycled to step (a).

4. A process according to claim 3 wherein the temperature of said molten medium of phosphorus triiodide is from 65° C. to about 85° C. and wherein the temperature during the hydrolysis of said phosphorus triiodide is below about 80° C.

5. A process according to claim 4 wherein said water to phosphorus weight ratio is from about 1.46:1 to about 50:1 and the temperature during said hydrolysis is from about 20° C. to about 80° C.

6. A process according to claim 5 wherein said ratio of water to phosphorus is greater than about 1.75:1 whereby a solution of orthophosphorous acid is prepared.

References Cited

UNITED STATES PATENTS 2,670,274   2/1954   Jones _____ 23—165

OTHER REFERENCES

Van Wazer, "Phosphorus and Its Compounds," vol. 1, pp. 220, 221, 227 and 228 (1958).

E. Leuchenko et al., Zhur. Obshechei Khim. 29, 1474–7 (1959).

OSCAR R. VERTIZ, *Primary Examiner.*

ARTHUR GREIF, *Assistant Examiner.*

U.S. Cl. X.R.

23—87